(12) United States Patent
Zhou et al.

(10) Patent No.: US 10,990,353 B2
(45) Date of Patent: *Apr. 27, 2021

(54) ADDRESS INFORMATION-BASED ACCOUNT MAPPING METHOD AND APPARATUS

(71) Applicant: Advanced New Technologies Co., Ltd., George Town (KY)

(72) Inventors: Yang Zhou, Hangzhou (CN); Jun Xiong, Hangzhou (CN); Dijun He, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 245 days.

This patent is subject to a terminal disclaimer.

(21) Appl. No.: 15/949,981

(22) Filed: Apr. 10, 2018

(65) Prior Publication Data
US 2018/0232206 A1 Aug. 16, 2018

Related U.S. Application Data

(63) Continuation of application No. PCT/CN2016/101639, filed on Oct. 10, 2016.

(30) Foreign Application Priority Data

Oct. 14, 2015 (CN) .......................... 201510661892.4

(51) Int. Cl.
*G06F 7/20* (2006.01)
*G06F 16/29* (2019.01)
(Continued)

(52) U.S. Cl.
CPC ................ *G06F 7/20* (2013.01); *G06F 16/00* (2019.01); *G06F 16/215* (2019.01);
(Continued)

(58) Field of Classification Search
CPC ...... G06F 16/29; G06F 3/0482; G06F 16/951; G06F 16/9537; G06F 3/0481; G06F 3/0488; G06F 16/24
(Continued)

(56) References Cited

U.S. PATENT DOCUMENTS 10,725,737 B2   7/2020  Zhou et al.
2002/0072377 A1   6/2002  Fan et al.
(Continued)

FOREIGN PATENT DOCUMENTS

CN   101882163   11/2010
CN   102932414   2/2013
(Continued)

OTHER PUBLICATIONS cmu.edu [online], "kd-Trees CMSC 420," 2008, retrieved on Jul. 23, 2019, retrieved from: URL<https://www.cs.cmu.edu/~ckingsf/bioinfo-lectures/kdtrees.pdf>, 19 pages.
(Continued)

*Primary Examiner* — Angelica Ruiz
(74) *Attorney, Agent, or Firm* — Fish & Richardson P.C.

(57) ABSTRACT

Multiple items of first address information are identified by a server associated with a first service provider. Each item of first address information is identified from a corresponding item of first account information provided by the first service provider. Multiple items of second address information are identified by the server. Each item of second address information is identified from a corresponding item of second account information provided by a second service provider. For each item of first address information, a determination is made, by the server, that an item of second address information matches the particular item of first address information, and a mapping relationship is established, by the server, between an item of first account information,
(Continued)

corresponding to the particular item of first address information, and an item of second account information, corresponding to the item of second address information.

20 Claims, 8 Drawing Sheets

(51) Int. Cl.
    *G06F 16/2458* (2019.01)
    *G06F 16/00* (2019.01)
    *G06F 16/215* (2019.01)
    *G06Q 20/14* (2012.01)
    *G06Q 50/06* (2012.01)

(52) U.S. Cl.
    CPC .......... *G06F 16/2465* (2019.01); *G06F 16/29* (2019.01); *G06Q 20/14* (2013.01); *G06Q 50/06* (2013.01)

(58) Field of Classification Search
    USPC ........... 707/600–831, 899, 999.001–999.206
    See application file for complete search history.

(56) References Cited

U.S. PATENT DOCUMENTS

| | | | |
|---|---|---|---|
| 2006/0271281 A1* | 11/2006 | Ahn | G01C 21/26 |
| | | | 701/532 |
| 2007/0233658 A1 | 10/2007 | Coughlin et al. | |
| 2008/0048890 A1* | 2/2008 | Sheha | G01C 21/36 |
| | | | 340/995.1 |
| 2010/0024019 A1 | 1/2010 | Backlund | |
| 2011/0173268 A1 | 7/2011 | Cai et al. | |
| 2011/0282988 A1 | 11/2011 | Wang et al. | |
| 2013/0285855 A1 | 10/2013 | Dupray et al. | |
| 2014/0123247 A1 | 5/2014 | Abhyanker | |
| 2014/0130140 A1 | 5/2014 | Abhyanker | |
| 2014/0189013 A1* | 7/2014 | Abhyanker | G06F 21/62 |
| | | | 709/204 |
| 2015/0020195 A1* | 1/2015 | Alizadeh-Shabdiz | |
| | | | H04L 61/2046 |
| | | | 726/22 |
| 2015/0233718 A1 | 8/2015 | Grokop | |
| 2018/0024943 A1* | 1/2018 | Xu | G06Q 20/34 |
| | | | 711/163 |
| 2018/0052868 A1 | 2/2018 | Siris et al. | |
| 2020/0125327 A1 | 8/2020 | Zhou et al. | |

FOREIGN PATENT DOCUMENTS

| | | |
|---|---|---|
| CN | 104573057 | 4/2015 |
| CN | 104767672 | 7/2015 |
| CN | 104778606 | 7/2015 |
| CN | 104899202 | 9/2015 |
| CN | 104954322 | 9/2015 |
| JP | 2005011049 | 1/2005 |
| JP | 2012174074 | 9/2012 |
| JP | 2013506926 | 2/2013 |
| JP | 2013161366 | 8/2013 |
| JP | 5662158 | 1/2015 |
| KR | 100684445 | 2/2007 |
| KR | 101042361 | 6/2011 |
| WO | 2014160582 | 2/2014 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report of the International Searching Authority issued in International Application No. PCT/CN2016/101639 dated Jan. 23, 2017; 9 pages.

Extended European Search Report issued in EP Application No. 16854910.3 dated Jul. 16, 2018; 11 pages.

Oana Goga; "Matching User Accounts Across Online Social Networks: Methods and Applications"; Computer Science, LIP6, May 21, 2014.

Written Opinion in Singaporean Application No. 11201803052Q, dated Dec. 26, 2018, 6 pages.

International Preliminary Report on Patentability in International Application No. PCT/CN2016/101639 dated Apr. 17, 2018, 9 pages (with English translation).

* cited by examiner

ADDRESS INFORMATION-BASED ACCOUNT MAPPING METHOD AND APPARATUS

This application is a continuation of PCT Application No. PCT/CN2016/101639, filed on Oct. 10, 2016, which claims priority to Chinese Patent Application No. 201510661892.4, filed on Oct. 14, 2015, and each application is hereby incorporated by reference in its entirety.

TECHNICAL FIELD

The present application relates to network technologies, and in particular, to account mapping method and apparatus based on address information.

BACKGROUND

With the development of Internet information technologies, it is increasingly common for various service providers to provide services for users over the Internet. For example, services for living expense payments such as electricity bill and water bill that are generally needed by users can be provided through the Internet.

Currently, a user can use application software provided by application service providers to perform payments of living expenses, and needs to enter a payment account number provided by a payment service provider. However, it is difficult for the user to remember the payment account number, hence results in poor user experience.

Application service providers generally have their own account systems that include application accounts, user address information, etc., so as to provide different services for users. For example, in addition to living expense payment services, information recommendation services, product acquisition services, etc., can be provided for the users. Payment service providers for living expense payment can also have their own account systems that include payment account numbers, user address information, etc. It can be seen that if an association relationship can be established between an account system of an application service provider and an account system of a payment service provider, the application service provider can directly provide payment services for a user by using an application account registered by the user.

However, no related technology has been available for establishing association relationships between different account systems.

SUMMARY

Embodiments of the present application provide account mapping method and apparatus based on address information, so as to establish association relationships between different account systems.

An embodiment of the present application provides an account mapping method based on address information, including: extracting first address information from each of a plurality of items of first account information provided by a first service provider, and extracting second address information from each of a plurality of items of second account information provided by a second service provider; for each item of extracted first address information, searching the plurality of items of extracted second address information for second address information that matches the first address information; and after the second address information that matches the first address information is identified, establishing a mapping relationship between first account information that includes the first address information and second account information that includes the identified second address information.

Optionally, after the extraction of the first address information from each of the plurality of items of first account information provided by a first service provider, and the extraction of the second address information from each of the plurality of items of second account information provided by a second service provider, the method further includes: extracting address feature information from each of the plurality of items of extracted first address information and each of the plurality of items of extracted second address information; where for each item of extracted first address information, the searching of the plurality of items of extracted second address information for second address information that matches the first address information includes: determining, according to address feature information corresponding to the first address information and address feature information corresponding to each of the plurality of items of second address information, a second address information candidate set that matches the first address information, where each item of second address information in the second address information candidate set and the first address information satisfy a predetermined address feature matching condition; and selecting, from the determined second address information candidate set, second address information that matches the first address information.

Optionally, the address feature information includes one or more of latitude and longitude information, point of interest (POI) information, or numeric substring information.

The predetermined address feature matching condition that the first address information and any second address information in the second address information candidate set satisfy includes one or more of the following conditions: a distance between latitude and longitude of the second address information and those of the first address information is less than a predetermined distance threshold; POI information corresponding to the second address information and POI information corresponding to the first address information are the same; and a maximum quantity of same consecutive numeric substrings between the second address information and the first address information is greater than a predetermined quantity threshold, where each numeric substring corresponds to a location range of an address, and different numeric substrings of a same address correspond to different location ranges of the address.

Optionally, if the address feature information includes latitude and longitude information, latitude and longitude information corresponding to the extracted first address information and second address information are identified by searching a latitude and longitude library that stores a mapping relationship between address information and latitude and longitude; if the address feature information includes POI information, the POI information is extracted from the first address information and the second address information according to predetermined keyword information corresponding to the POI information; or if the address feature information includes numeric substring information, numeric substring information is extracted from the first address information and the second address information according to a predetermined numeric substring matching mode.

Optionally, it is determined, according to the following steps, that the POI information corresponding to the second address information and POI information corresponding to the first address information are the same: after it is determined that both the second address information and the first address information include POI information, mapping each item of the POI information in the second address information and the POI information in the first address information to standardized POI information in a door address library; and when the standardized POI information in the door address library to which the POI information in the second address information is mapped is the same as the standardized POI information in the door address library to which the POI information in the first address information is mapped, determining that the POI information corresponding to the second address information is the same as the POI information corresponding to the first address information.

Optionally, the extracting address feature information from each of the plurality of items of extracted first address information and each of the plurality of items of extracted second address information includes: extracting latitude and longitude information, POI information, and numeric substring information from each of the plurality of items of extracted first address information and each of the plurality of items of extracted second address information; and the determining, according to address feature information corresponding to the first address information and address feature information corresponding to each of the plurality of items of second address information, a second address information candidate set that matches the first address information includes: for each item of second address information, determining whether POI information corresponding to the second address information is the same as the POI information corresponding to the first address information; after it is determined that the POI information corresponding to the second address information is the same as the POI information corresponding to the first address information, determining, based on latitude and longitude information in the second address information and latitude and longitude information in the first address information, a distance between latitude and longitude corresponding to the second address information and latitude and longitude corresponding to the first address information, and determining, based on numeric substring information in the second address information and numeric substring information in the first address information, a maximum quantity of same consecutive numeric substrings between the second address information and the first address information; and when the distance between the latitude and longitude corresponding to the second address information and the latitude and longitude corresponding to the first address information is less than a predetermined distance threshold, and the maximum quantity of same consecutive numeric substrings between the second address information and the first address information is greater than a predetermined quantity threshold, grouping the second address information into the second address information candidate set that matches the first address information.

Optionally, the selecting, from the determined second address information candidate set, second address information that matches the first address information includes: for any second address information in the determined second address information candidate set, determining a matching value between the second address information and the first address information based on a latitude and longitude matching value and latitude and longitude matching significance between the second address information and the first address information, and a numeric substring matching value and a numeric substring matching significance between the second address information and the first address information; and selecting second address information that has a highest matching value as the second address information that matches the first address information.

Optionally, the latitude and longitude matching value $S1$ between the second address information and the first address information can be determined based on the following equation:

$$S1 = ke^{-d(c1,c2)}, \text{ where}$$

$d(c1, c2)$ is a distance between the latitude and longitude $c1$ corresponding to the second address information, and the latitude and longitude $c2$ corresponding to the first address information, and $k$ is a constant.

Optionally, the numeric substring matching value $S2$ between the second address information and the first address information is determined based on the following equation:

$$S2 = pN, \text{ where}$$

$N$ is a maximum quantity of same consecutive numeric substrings between the second address information and the first address information, and $p$ is a constant.

An embodiment of the present application provides an account mapping apparatus based on address information, including: an extraction module, configured to: extract first address information from each of a plurality of items of first account information provided by a first service provider, and extract second address information from each of a plurality of items of second account information provided by a second service provider; a search module, configured to: for each item of first address information extracted by the extraction module, search the plurality of items of extracted second address information for second address information that matches the first address information; and a mapping module, configured to: after the search module identifies the second address information that matches the first address information, establish a mapping relationship between first account information that includes the first address information and second account information that includes the second address information identified by the search module.

It can be seen that, in the embodiments of the present application, a mapping relationship between account information of different account systems is established according to address information included in the account information. Account information of a user at the second service provider can be located based on the mapping relationship and account information registered by the user with the first service provider, so that a service related to the second service provider can be processed by using a window provided by the first service provider.

DESCRIPTION OF EMBODIMENTS

In the embodiments of the present application, first address information is extracted from each of a plurality of items of first account information provided by a first service provider, and second address information is extracted from each of a plurality of items of second account information provided by a second service provider; for each item of extracted first address information, the plurality of items of extracted second address information are searched for second address information that matches the first address information; and after the second address information that matches the first address information is identified, a mapping relationship between first account information that includes the first address information and second account information that includes the identified second address information is extracted from is established. It can be seen that, in the embodiments of the present application, a mapping relationship between account information of different account systems is established according to address information included in the account information. Account information of a user at the second service provider can be located based on the mapping relationship and account information registered by the user with the first service provider, so that a service related to the second service provider can be processed by using a window provided by the first service provider. For example, when the first service provider is an application service provider, and the second service provider is a payment service provider for living payment (electricity bills, water bills, gas bills, etc.), application software provided by the first service provider can be used to perform payment for charging items provided by the second service provider.

The following further describes the embodiments of the present application in detail with reference to the accompanying drawings of the specification.

Embodiment 1

Figure 1:
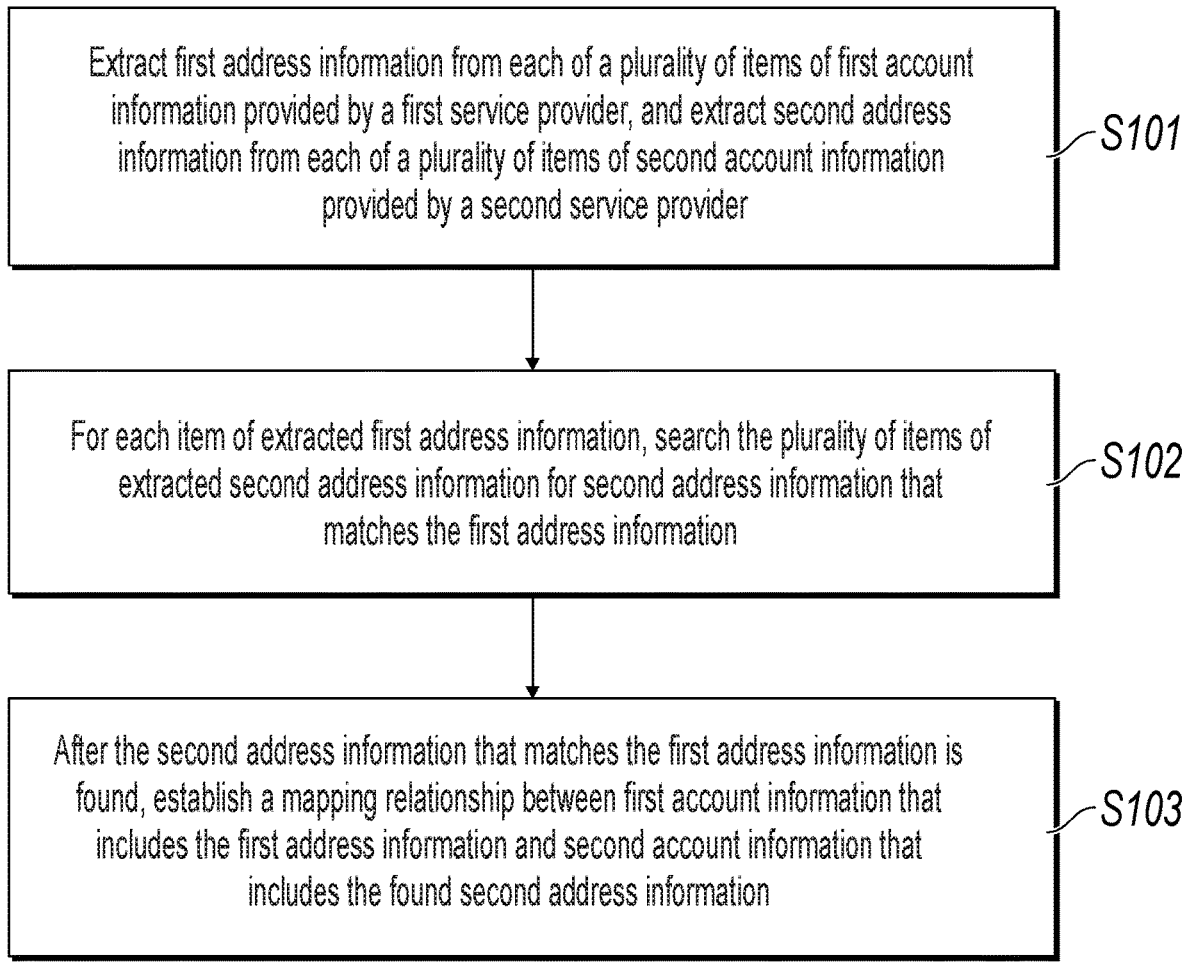
FIG. 1 is a flowchart of an address information-based account mapping method according to Embodiment 1 of the present application.

As shown in FIG. 1, FIG. 1 is a flowchart of an address information-based account mapping method according to Embodiment 1 of the present application. The method includes the following steps:

S101: Extract first address information from each of a plurality of items of first account information provided by a first service provider, and extract second address information from each of a plurality of items of second account information provided by a second service provider.

This embodiment of the present application can be executed by a server of a first service provider. The first service provider can be a service provider that provides an application service for a user, and the first account information of the first service provider can include an account registered by the user, and first address information such as a delivery address that is input when the user performs registration or uses the application service.

In specific implementation, the second service provider can provide second account information of users to the first service provider. The second account information includes an account (for example, a payment account number) of a user, second address information, etc.

S102: For each item of extracted first address information, search the plurality of items of extracted second address information for second address information that matches the first address information.

In this step, matching second address information is searched for each item of first address information in the plurality of items of first account information. Here, the second address information matches the first address information can mean that an address indicated by the first address information and an address indicated by the second address information are consistent. The address indicated by the first address information and the address indicated by the second address information are consistent can include the situation that the first address information and the second address information are the same, or the situation that first address information and the second address information are expressed in different forms but indicate the same address. Because the latter situation is more common, Embodiment 2 of the present application provides a specific implementation for searching the second address information that matches the first address information. For details, refer to the description of Embodiment 2.

S103: After the second address information that matches the first address information is identified, establish a mapping relationship between first account information that includes the first address information and second account information that includes the identified second address information.

Here, after second address information that matches each item of first address information is identified, a mapping relationship between two account systems can be established by using the address information. That is, in this embodiment of the present application, it is considered that two accounts with consistent address information belong to the same user.

Applications of the earlier discussed method:

After a service processing request related to second account information and triggered by a user is received (for example, the service processing request is a living expense payment request, and correspondingly, the second account information is living expense payment account information; however, it is assumed that the user does not provide the second account information, but only triggers the living expense payment request), according to an established mapping relationship and first account information of the user, the second account information corresponding to the first account information is determined, and the service processing request is executed according to the identified second account information.

Embodiment 2

Because a same address can be expressed in different forms, language, or level of details in different account systems. When performing address matching, if only when identical first address information and second address information is considered a match, the address information matching success rate can be very low. Based on this, Embodiment 2 of the present application provides a preferred implementation for address matching.

Figure 2:
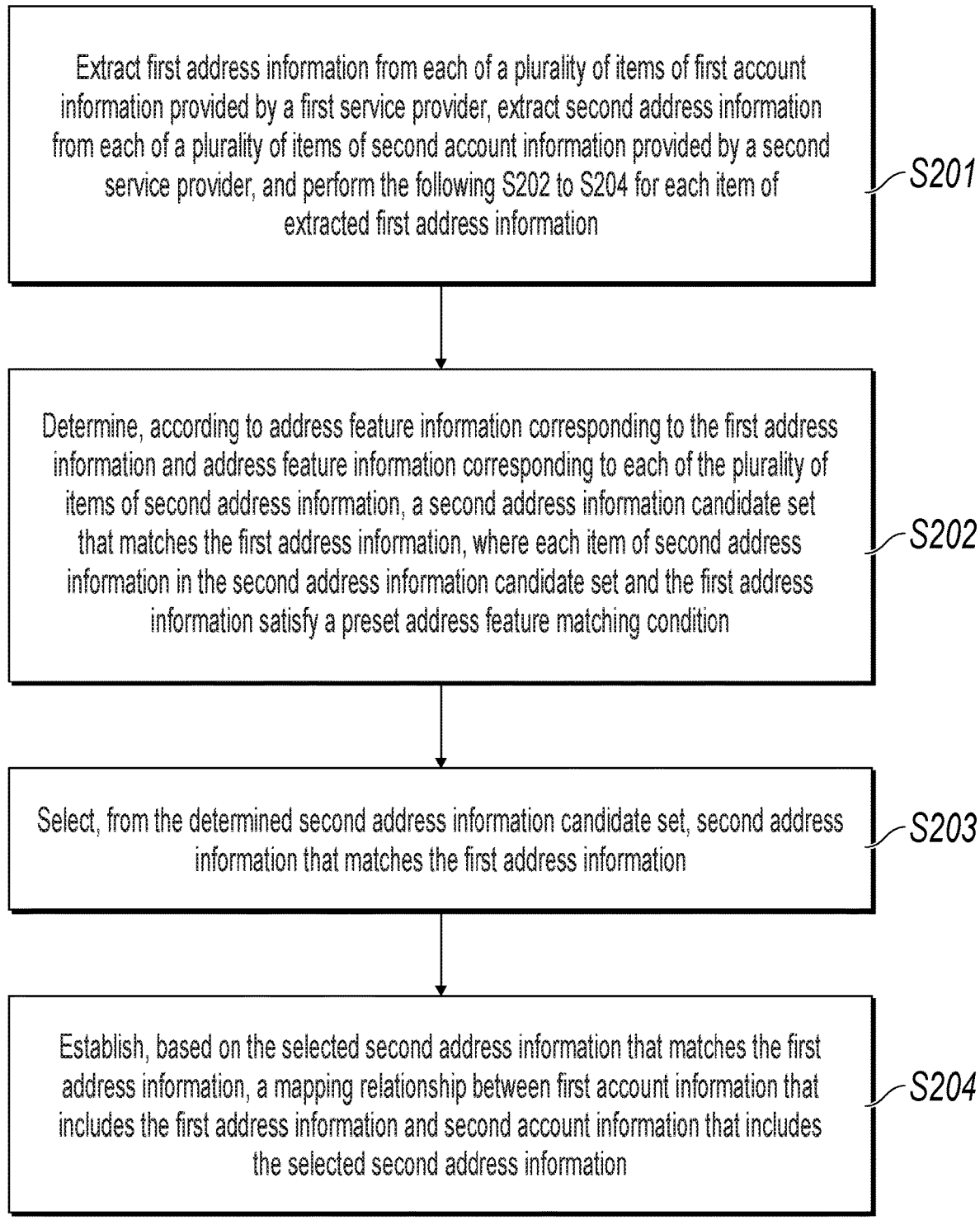
FIG. 2 is a flowchart of an address information-based account mapping method according to Embodiment 2 of the present application.

As shown in FIG. 2, FIG. 2 is a flowchart of an address information-based account mapping method according to Embodiment 2 of the present application. The method includes the following steps:

S201: Extract first address information from each of a plurality of items of first account information provided by a first service provider, extract second address information from each of a plurality of items of second account information provided by a second service provider, and perform the following S202 to S204 for each item of extracted first address information.

S202: Determine, according to address feature information corresponding to the first address information and address feature information corresponding to each of the plurality of items of second address information, a second address information candidate set that matches the first address information, where each item of second address information in the second address information candidate set and the first address information satisfy a predetermined address feature matching condition.

In a specific implementation process, address information is probably input by a user manually, different users have different input habits, and different habits of using full-width Pinyin, characters, traditional Chinese characters, special symbols, etc. make it very difficult to perform address matching. Therefore, before address matching is performed, these types of interference can be first eliminated, that is, a format of address information is pre-processed. For example, as shown in Table 1, Table 1 lists several pre-processing types:

TABLE 1

| Pre-processing type | Example |
| --- | --- |
| Switch from a full-width character to a half-width character | Switch from full-width symbol to half-width symbol |
| Switch from a Chinese numeral to an Arabic numeral | Switch from "One" in "Building One" in Chinese to "1" in "Building 1" in Arabic |
| Switch from Traditional Chinese to Simplified Chinese | Switch from "Building One" in Traditional Chinese to "Building One" in Simplified Chinese |
| Switch from an uppercase English letter to a lowercase English letter | Switch from "District A" to "District a" |
| Switch between special symbols | Switch from "No. III" to "No. 3" |

After the first address information and the second address information are pre-processed, the first address information and the second address information are parsed to obtain address feature information corresponding to each item of the first address information and address feature information corresponding to each item of the second address information. The address feature information can include one or more of latitude and longitude information, POI information, or numeric substring information (for example, a road number, a building number, a floor number, and a room number are considered as numeric substring information). Each item of first address information or second address information can include one or more numeric substrings. Each numeric substring corresponds to a location range of an address. Different numeric substrings of a same address correspond to different location ranges of the address. For example, a road number and a building number correspond to different location ranges.

In a specific implementation, latitude and longitude information corresponding to the first address information and the second address information can be identified by searching a latitude and longitude library that stores a mapping relationship between address information and latitude and longitude. POI information can be extracted from the first address information and the second address information according to predetermined keyword information corresponding to the POI information (for example, based on a keyword "road", "POI information: 256 Tianmushan Road and 18 Wantang Road" is extracted). In addition, numeric substring information is extracted according to a predetermined numeric substring matching mode (for example, a road number, a building number, a floor number, and a room number are successively matched).

For example, assume that the first address information is "Floor 2, Building MM, 256 Tianmushan Road, Hangzhou, Zhejiang Province", and the second address information is "Floor 2, Building MM, 18 Wantang Road, Hangzhou, Zhejiang Province". The first address information is parsed to obtain POI information: 256 Tianmushan Road, and latitude and longitude: (30.122, 102.589); fuzzy match can be performed to obtain a road number: No. 256, a building number: n/a, a floor number: floor 2, a room number: n/a, and numeric substring information of the first address information is 256*2*, where "*" means that a location range identified by "*" has no corresponding numeric substring. The second address information is parsed to obtain POI information: 18 Wantang Road, and latitude and longitude: (30.121, 102.583); fuzzy match is performed to obtain a road number: No. 18, a building number: n/a, a floor number: floor 2, a room number: n/a, and numeric substring information of the second address information is 18*2*.

After the address feature information is obtained by parsing the first address information and the second address information, for each item of first address information, at least one item of second address information can be searched for, according to the predetermined address feature matching condition, to form the second address information candidate set, where the at least one item of second address information and the first address information satisfy the predetermined address feature matching condition. The predetermined address feature matching condition that the first address information and any second address information in the second address information candidate set satisfy includes one or more of the following three conditions:

Condition 1: A distance between latitude and longitude of any second address information and latitude and longitude of the first address information is less than a predetermined distance threshold;

Condition 2: POI information corresponding to any second address information and POI information corresponding to the first address information are the same; and Condition 3: A maximum quantity of same consecutive numeric substrings between any second address information and the first address information is greater than a predetermined quantity threshold.

For condition 1, the first address information is parsed to obtain the latitude and longitude corresponding to the first address information, and the second address information is parsed to obtain the latitude and longitude corresponding to the second address information. Here, the latitude and longitude can be obtained based on an existing map application by using the address information.

Figure 3:
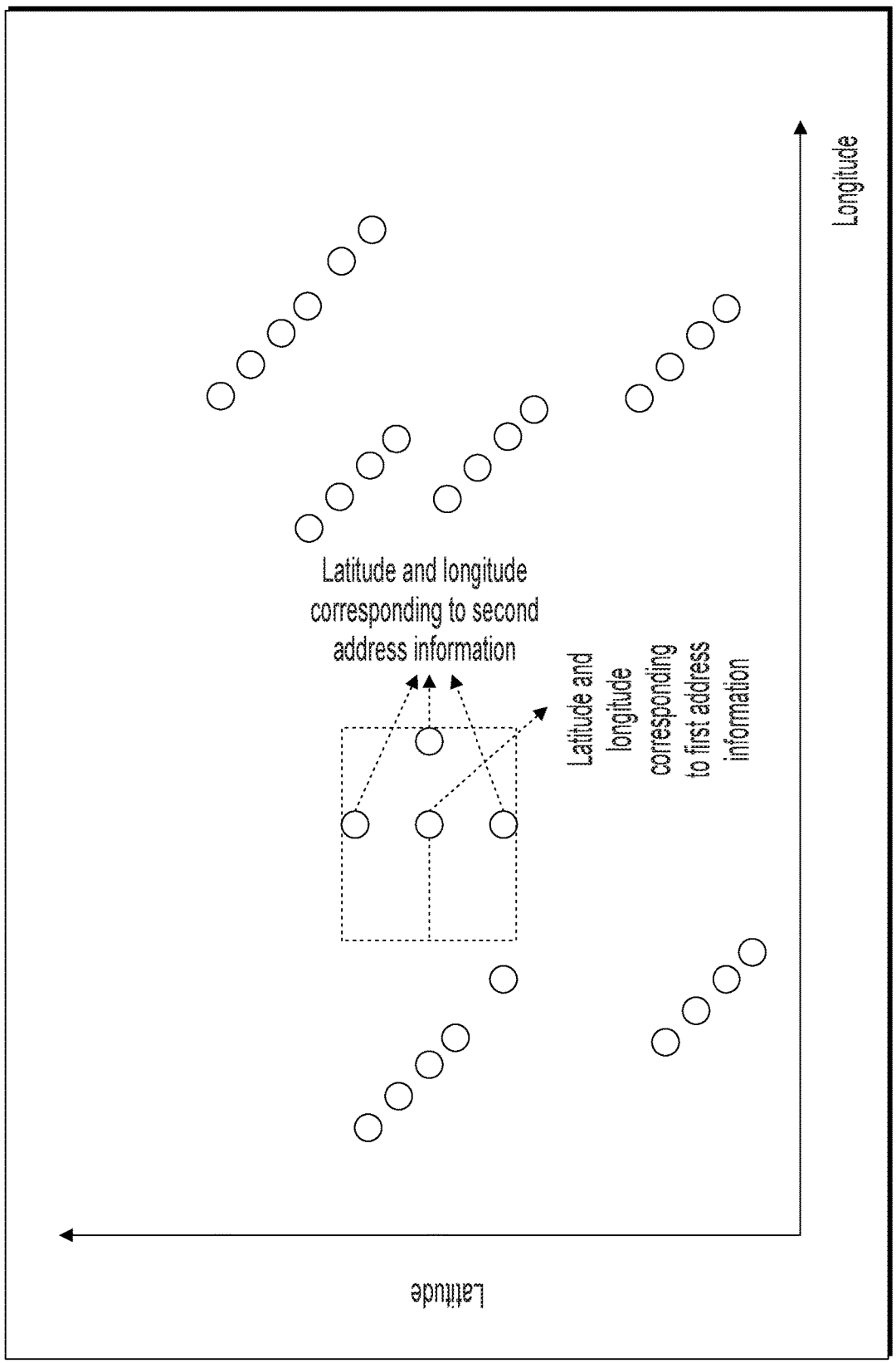
FIG. 3 is a latitude and longitude scatter chart.

In a specific implementation process, to improve search efficiency, search can be performed by using a k-d tree. Because search needs to be performed based on latitude and longitude in this embodiment of the present application, a 2-dimensional k-d tree (that is, a 2-d tree) can be used. As shown in FIG. 3, FIG. 3 is a latitude and longitude scatter chart, and each dot indicates a latitude and longitude point corresponding to one item of address information. If traversing is used to sequentially calculate distances between latitude and longitude of each item of extracted second address information and the latitude and longitude corresponding to the first address information to be matched with, considerable calculation resources can be wasted. If a 2-d tree search method is used, only latitude and longitude (corresponding points in a dashed box) of second address information that are close to the latitude and longitude corresponding to the first address information are selected for calculation. As such, considerable calculation resources can be saved.

For condition 2, POI information can be extracted from each of the first address information and the second address information, and if the two items of extracted POI information are the same, it can be considered that the POI information corresponding to the second address information and the POI information corresponding to the first address information are the same. However, because a same address usually has different description manners, and when a same address is described in different description manners in two account systems, POI information extracted from first address information and second address information that correspond to a same address can be different.

Based on this, after S201, a stored door address library can be searched, and POI information in each item of extracted first address information and second address information is mapped to standardized POI information in the door address library.

Then, in S202, it is determined, according to the following step, that the POI information corresponding to the second address information and the POI information corresponding to the first address information are the same:

when the standardized POI information in the door address library to which the POI information in the second address information is mapped is the same as the standardized POI information in the door address library to which the POI information in the first address information is mapped, determining that the POI information corresponding to the second address information is the same as the POI information corresponding to the first address information.

As such, the first address information and the second address information are expressed in a unified manner specified in the door address library. After expressions of address information are unified, it is determined whether the two items of POI information corresponding to the first address information and the second address information of different account systems are consistent, so that the success rate of matching POI information can be improved. For example, in the previous example, the POI information obtained by parsing the first address information is 256 Tianmushan Road, and the POI information obtained by parsing the second address information is 18 Wantang Road. After the door address library is queried, it is determined that the 256 Tianmushan Road can be referred to as Dragon Times Plaza after standardization, and the 18 Wantang Road can also be referred to as Dragon Times Plaza after standardization. Therefore, it can be considered that the POI information corresponding to the first address information and the POI information corresponding to the second address information are the same.

For condition 3, regular expression can be used to perform fuzzy match on the pre-processed first address information and second address information, to obtain numeric substrings such as a road number, a building number, a floor number, and a room number. When at least N corresponding numeric substrings such as road numbers, building numbers, floor numbers, and room numbers of the first address information and the second address information are the same, it can be considered that the condition 3 is met, where N is the predetermined quantity threshold.

In a specific implementation process, the second address information candidate set can be determined based on any one of the previously mentioned conditions, or the second address information candidate set can be determined based on a combination of two or three of the previously described conditions 1 to 3.

Figure 4:
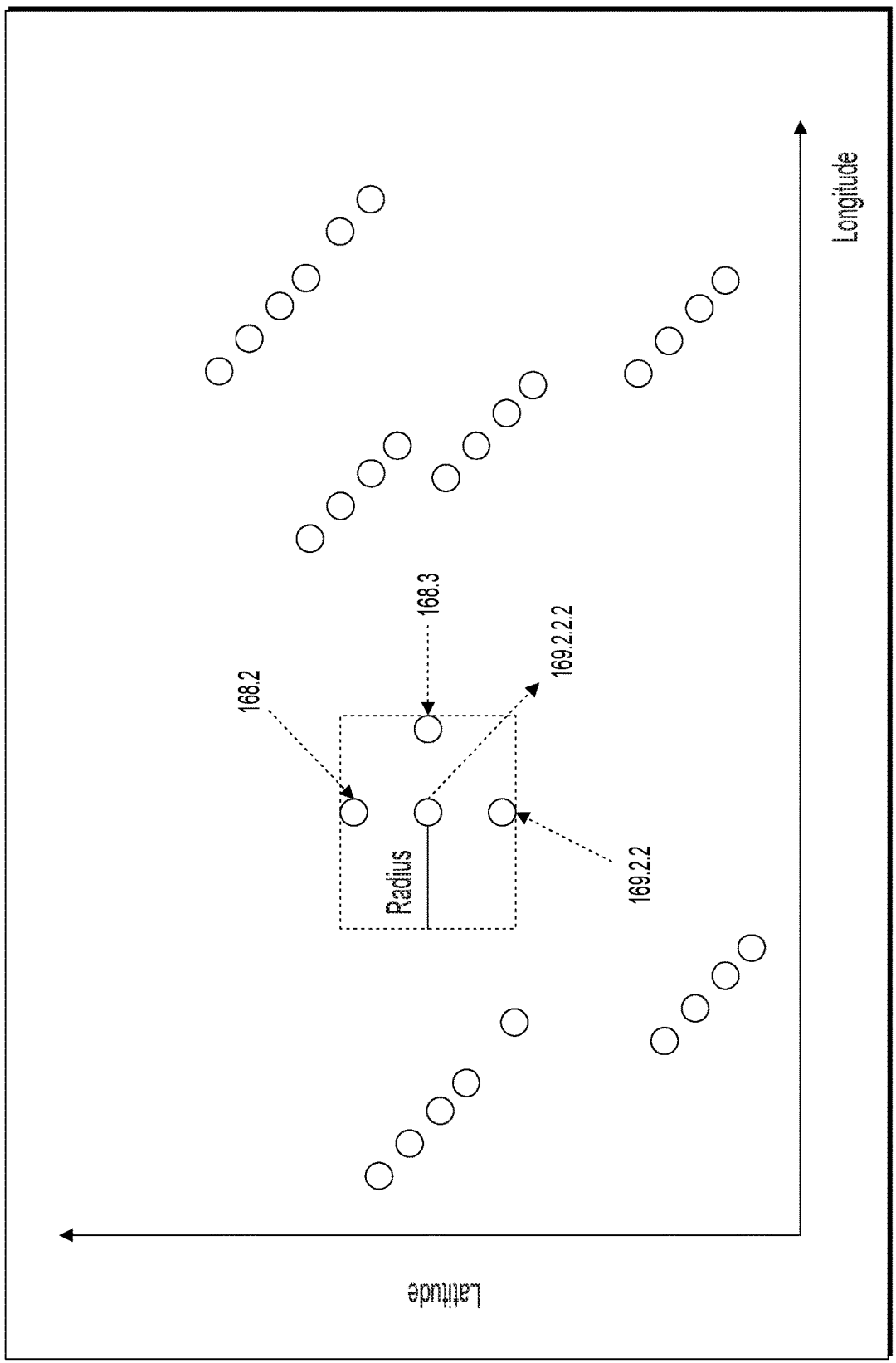
FIG. 4 is a schematic diagram of determining a second address information candidate set.

For example, condition 1 and condition 3 are combined: for first address information "No. 2, Unit 2, Block 2, 169 Han'an Avenue, Dongxing District, Neijiang, Sichuan Province", four numeric substrings can be obtained by fuzzy match using regular expression: 169, 2, 2, 2 (here, a definition of each numeric substring can be predetermined. For example, numeric sub string definitions are sequentially a road number, a building number, a unit number, and a room number in descending order in terms of geographic range), and latitude and longitude corresponding to the first address information are (29.602631, 105.071571). It is assumed that the predetermined distance threshold is 3 km. A point corresponding to the latitude and longitude (29.602631, 105.071571) can be used as a center, and 3 km is used as radius to search for second address information that is included in the second address information candidate set. Assume that three items of second address information are identified. As shown in FIG. 4, numeric substrings of the three items of second address information are: 168, 2; 169, 2, 2; and 168, 3. A quantity of same numeric substrings (that is, common numeric strings) of the numeric substrings 169, 2, 2 and 169, 2, 2, 2 is 3, which is greater than the predetermined quantity threshold of 2. Therefore, only second address information corresponding to the numeric substring 169, 2, 2 can be grouped into the second address information candidate set. If condition 2 is also considered to determine the second address information candidate set, the second address information that is grouped into the second address information candidate set can further satisfy the following condition: Standardized POI information in the door address library corresponding to the second address information is the same as the standardized POI information in the door address library corresponding to the first address information. For example, the standardized POI information in the door address library corresponding to the second address information that is grouped into the second address information candidate set is "169 Han'an Avenue, Dongxing District, Neijiang, Sichuan Province", which is the same as the standardized POI information in the door address library corresponding to the first address information.

S203: Select, from the determined second address information candidate set, second address information that matches the first address information.

In a specific implementation process, when the second address information candidate set includes only one item of second address information, the second address information can be used as an eventually selected second address information. If the second address information candidate set includes a plurality of items of second address information, a selection method is as follows: The determined second address information candidate set can be presented to a user, and the user selects, from the second address information candidate set, an item of second address information that best matches the first address information. Another selection method is as follows: A matching score between the first address information and each item of second address information in the second address information candidate set is calculated, and second address information that is the best match can be selected based on the matching score obtained based on calculation. For details, refer to the description of Embodiment 3.

S204: Establish a mapping relationship between first account information that includes the first address information and second account information that includes the selected second address information based on the selected second address information that matches the first address information.

Embodiment 3

Figure 5:
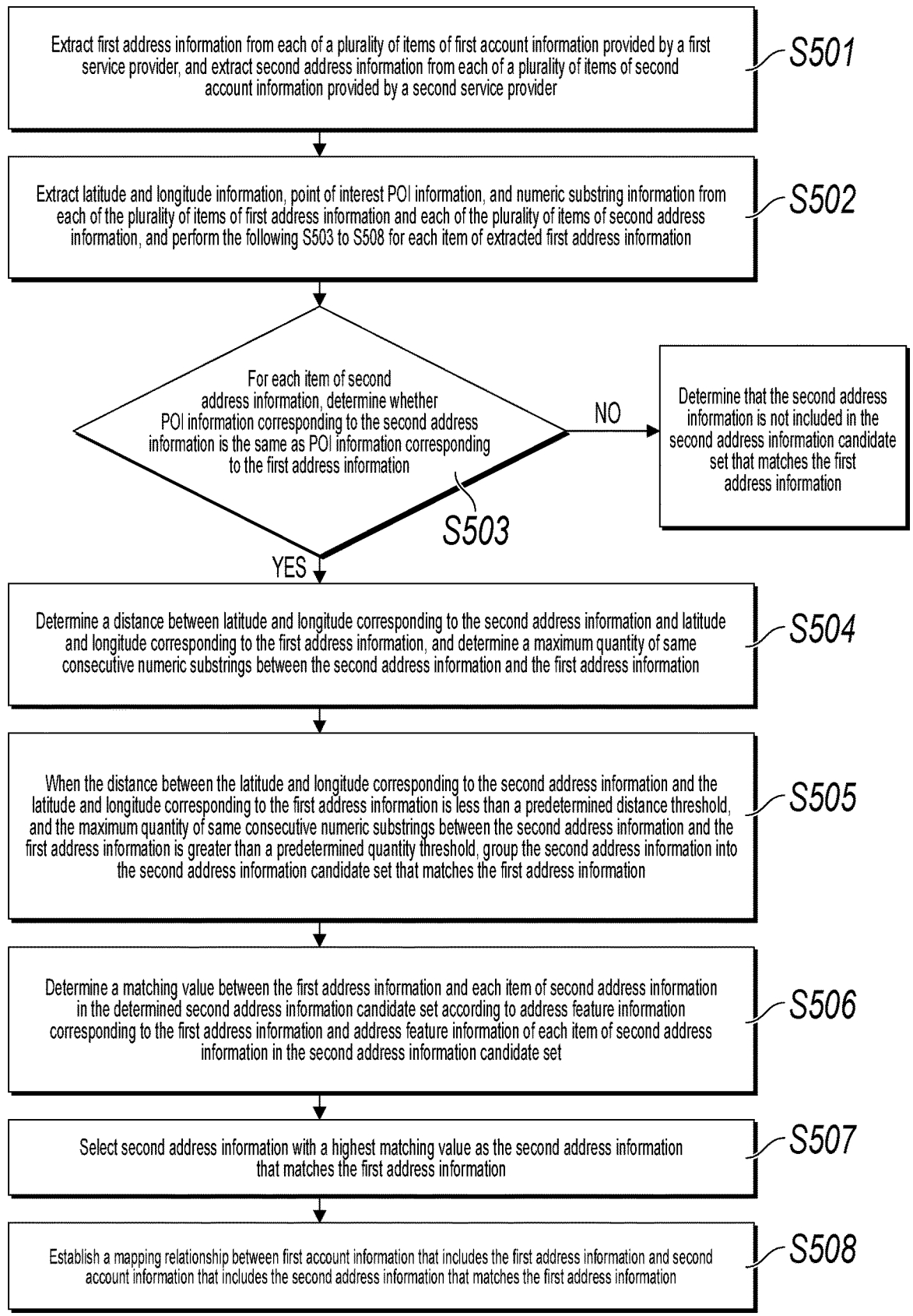
FIG. 5 is a flowchart of an address information-based account mapping method according to Embodiment 3 of the present application.
Figure 6:
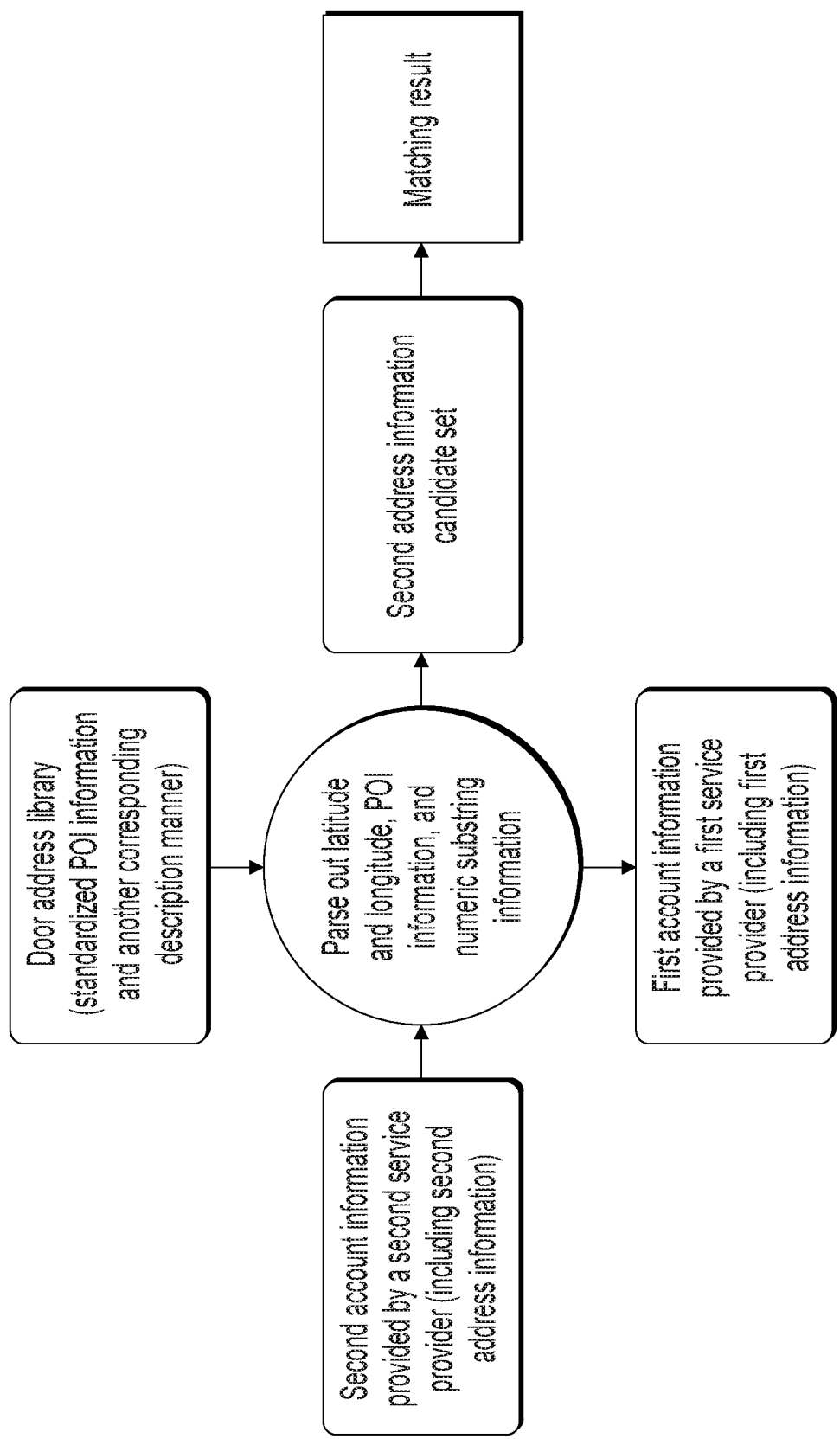
FIG. 6 is a schematic diagram of an address matching framework corresponding to FIG. 5.

As shown in FIG. 5, FIG. 5 is a flowchart illustrating a mapping relationship establishment method according to Embodiment 3 of the present application. FIG. 6 is a schematic diagram of an address matching framework corresponding to FIG. 5. The method includes the following steps:

S501: Extract first address information from each of a plurality of items of first account information provided by a first service provider, and extract second address information from each of a plurality of items of second account information provided by a second service provider.

Afterwards, formats of the extracted first address information and second address information can be first pre-processed based on a predetermined pre-processing type, and the steps such as switching from a full-width character to a half-width character, from a Chinese numeral to an Arabic numeral, from Traditional Chinese to Simplified Chinese, and from an uppercase English letter to a lowercase English letter can be performed after interferences results from address matching are eliminated.

S502: Extract latitude and longitude information, POI information, and numeric substring information from each of the plurality of items of first address information and each of the plurality of items of second address information, and perform steps S503 to S508 for each item of extracted first address information.

S503: For each item of second address information, determine whether POI information corresponding to the second address information is the same as POI information corresponding to the first address information; if the POI information corresponding to the second address information is the same as the POI information corresponding to the first address information, perform S504. Or, if the POI information corresponding to the second address information is different from the POI information corresponding to the first address information, determine that the second address information is not included in a second address information candidate set that matches the first address information.

When the present step is performed, the POI information corresponding to the first address information and the POI information corresponding to the second address information can be first standardized by using a door address library, and then it can be determined whether two items of standardized POI information are consistent.

S504: After it is determined that the POI information corresponding to the second address information is the same as the POI information corresponding to the first address information, determine, based on latitude and longitude information in the second address information and the first address information, a distance between latitude and longitude corresponding to the second address information and latitude and longitude corresponding to the first address information, and determine, based on a numeric substring in the second address information and the first address information, a maximum quantity of same consecutive numeric substrings between the second address information and the first address information.

S505: When the distance between the latitude and longitude corresponding to the second address information and the latitude and longitude corresponding to the first address information is less than a predetermined distance threshold, and the maximum quantity of same consecutive numeric substrings between the second address information and the first address information is greater than a predetermined quantity threshold, group the second address information into the second address information candidate set that matches the first address information.

S506: Determine a matching value between the first address information and each item of second address information in the determined second address information candidate set according to address feature information corresponding to the first address information and address feature information of each item of second address information in the second address information candidate set.

In a specific implementation process, for each item of second address information in the second address information candidate set, a matching value between the first address information and the second address information can be determined based on each address feature. Then, matching values for different address features between the second address information and the first address information are added up. The sum is used as the matching value between the second address information and the first address information.

For example, for any second address information in the determined second address information candidate set, the matching value between the second address information and the first address information can be determined based on a latitude and longitude matching value and latitude and longitude matching significance between the second address information and the first address information, and a numeric substring matching value and a numeric substring matching significance between the second address information and the first address information.

Here, the matching value S between the second address information and the first address information can be determined based on $S=\beta 1 S1+\beta 2 S2$. $\beta 1$ and $\beta 2$ are respectively the latitude and longitude matching significance and the numeric substring matching significance, $S1$ is the latitude and longitude matching value, and $S2$ is the numeric substring matching value. In an implementation, values of $\beta 1$ and $\beta 2$ can be determined based on experience, for example, a value of $\beta 1$ can be 0.3, and a value of $\beta 2$ can be 0.7.

Optionally, the latitude and longitude matching value $S1$ between the second address information and the first address information can be determined based on the following equation:

$$S1=ke^{-d(c1,c2)}, \text{ where}$$

d (c1, c2) is a distance between latitude and longitude c1 corresponding to the second address information and latitude and longitude c2 corresponding to the first address information, and k is a constant.

The numeric substring matching value S2 between the second address information and the first address information can be determined based on the following equation:

$$S2=pN, \text{ where}$$

N is the maximum quantity of same consecutive numeric substrings between the second address information and the first address information, and p is a constant.

S507: Select second address information that has a highest matching value as the second address information that matches the first address information.

S508: Establish a mapping relationship between first account information that includes the first address information and second account information that includes the second address information that matches the first address information.

Based on a same inventive concept, an embodiment of the present application further provides a mapping relationship establishment apparatus corresponding to the mapping relationship establishment method. Because the problem solving principles of the apparatus is similar to the mapping relationship establishment method described in the embodiments of the present application, reference can be made to the implementations of the method for the implementations of the apparatus. Duplicate descriptions are hence omitted.

Figure 7:
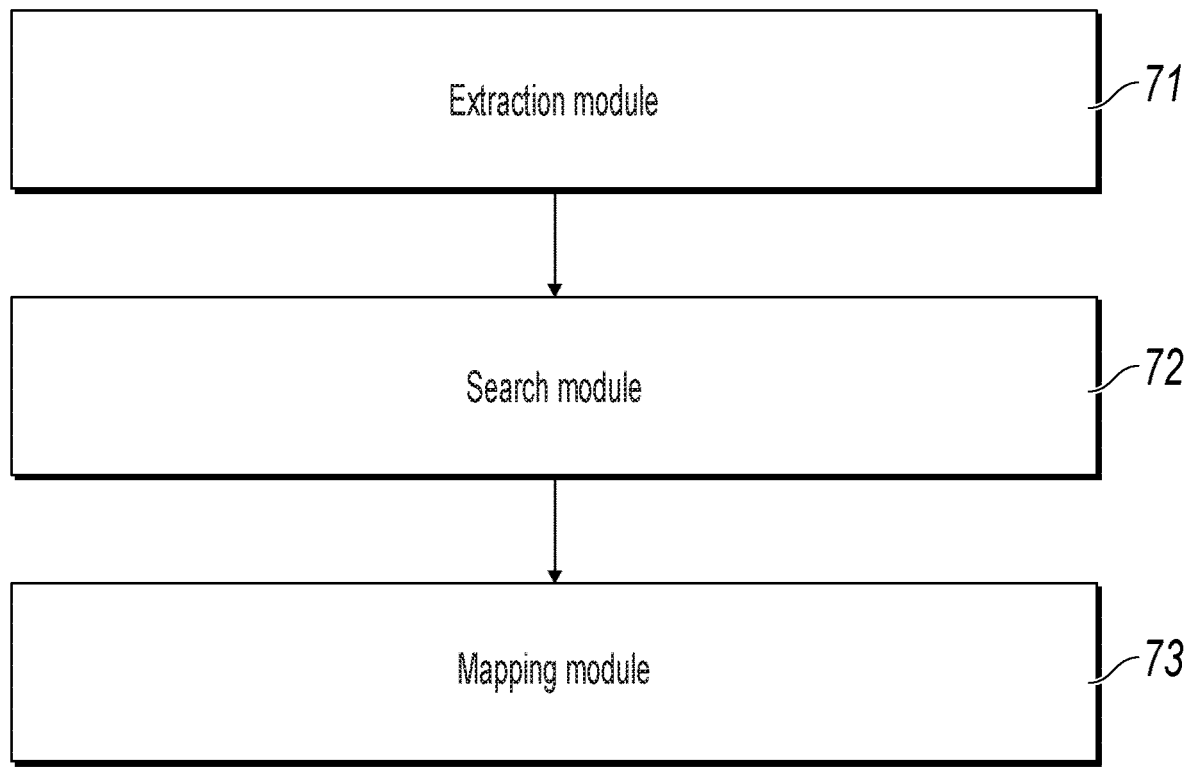
FIG. 7 is a schematic structural diagram of an address information-based account mapping apparatus according to an embodiment of the present application.

As shown in FIG. 7, FIG. 7 is a schematic structural diagram illustrating an account mapping apparatus based on address information according to an embodiment of the present application. The apparatus includes: an extraction module 71, configured to: extract first address information from each of a plurality of items of first account information provided by a first service provider, and extract second address information from each of a plurality of items of second account information provided by a second service provider; a search module 72, configured to: for each item of first address information extracted by the extraction module 71, search the plurality of items of extracted second address information for second address information that matches the first address information; and a mapping module 73, configured to: after the search module 72 identifies the second address information that matches the first address information, establish a mapping relationship between first account information that includes the first address information and second account information that includes the second address information identified by the search module.

Optionally, the search module 72 is specifically configured to: determine, according to address feature information corresponding to the first address information and address feature information corresponding to each of the plurality of items of second address information, a second address information candidate set that matches the first address information, where each item of second address information in the second address information candidate set and the first address information satisfy a predetermined address feature matching condition; and select, from the determined second address information candidate set, second address information that matches the first address information.

Optionally, the address feature information includes one or more of latitude and longitude information, POI information, or numeric substring information.

The predetermined address feature matching condition that the first address information and any second address information in the second address information candidate set satisfy includes one or more of the following conditions: a distance between latitude and longitude of the second address information and latitude and longitude of the first address information is less than a predetermined distance threshold; POI information corresponding to the second address information and POI information corresponding to the first address information are the same; and a maximum quantity of same consecutive numeric substrings between the second address information and the first address information is greater than a predetermined quantity threshold, where each numeric substring corresponds to a location range of an address, and different numeric substrings of a same address correspond to different location ranges of the address.

Optionally, the search module 72 is specifically configured to: if the address feature information includes latitude and longitude information, identify latitude and longitude information corresponding to the extracted first address information and second address information by searching a latitude and longitude library that stores a mapping relationship between address information and latitude and longitude; if the address feature information includes POI information, extract POI information from the first address information and the second address information based on predetermined keyword information corresponding to the POI information; or if the address feature information includes numeric substring information, extract numeric substring information from the first address information and the second address information based on a predetermined numeric substring matching mode.

Optionally, the search module 72 is further configured to: after it is determined that both the second address information and the first address information include POI information, map each item of the POI information in the second address information and the POI information in the first address information to standardized POI information in a door address library; and when the standardized POI information in the door address library to which the POI information in the second address information is mapped is the same as the standardized POI information in the door address library to which the POI information in the first address information is mapped, determine that the POI information corresponding to the second address information is the same as the POI information corresponding to the first address information.

Optionally, the extraction module 71 is specifically configured to: extract latitude and longitude information, POI information, and numeric substring information from each of the plurality of items of extracted first address information and each of the plurality of items of extracted second address information; and the search module 72 is specifically configured to: for each item of second address information, determine whether POI information corresponding to the second address information is the same as the POI information corresponding to the first address information; after it is determined that the POI information corresponding to the second address information is the same as the POI information corresponding to the first address information, determine, based on latitude and longitude information in the second address information and latitude and longitude information in the first address information, a distance between latitude and longitude corresponding to the second address information and latitude and longitude corresponding to the first address information, and determine, based on numeric substring information in the second address information and numeric substring information in the first address information, a maximum quantity of same consecutive numeric substrings between the second address information and the first address information; and when the distance between the latitude and longitude corresponding to the second address information and the latitude and longitude corresponding to the first address information is less than a predetermined distance threshold, and the maximum quantity of same consecutive numeric substrings between the second address information and the first address information is greater than a predetermined quantity threshold, group the second address information into the second address information candidate set that matches the first address information.

Optionally, the search module 72 is specifically configured to: for any second address information in the determined second address information candidate set, determine a matching value between the second address information and the first address information based on a latitude and longitude matching value and latitude and longitude matching significance between the second address information and the first address information, and a numeric substring matching value and a numeric substring matching significance between the second address information and the first address information; and select second address information that has a highest matching value as the second address information that matches the first address information.

Optionally, the search module 72 is specifically configured to determine the latitude and longitude matching value S1 between the second address information and the first address information based on the following equation:

$$S1 = ke^{-d(c1,c2)}, \text{ where}$$

d (c1, c2) is a distance between the latitude and longitude c1 corresponding to the second address information and the latitude and longitude c2 corresponding to the first address information, and k is a constant.

Optionally, the search module 72 is specifically configured to determine the numeric substring matching value S2 between the second address information and the first address information based on the following equation:

$$S2 = pN, \text{ where}$$

N is a maximum quantity of same consecutive numeric substrings between the second address information and the first address information, and p is a constant.

A person skilled in the art should understand that the embodiments of the present application can be provided as a method, a system, or a computer program product. Therefore, the present application can use a form of hardware only embodiments, software only embodiments, or embodiments with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams of the method, the apparatus (system), and the computer program product according to the embodiments of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

These computer program instructions can be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, a person skilled in the art can make various modifications and variations to the present application without departing from the spirit and scope of the present application. The present application is intended to cover these modifications and variations of the present application provided that they fall within the scope of protection described by the following claims and their equivalent technologies.

Figure 8:
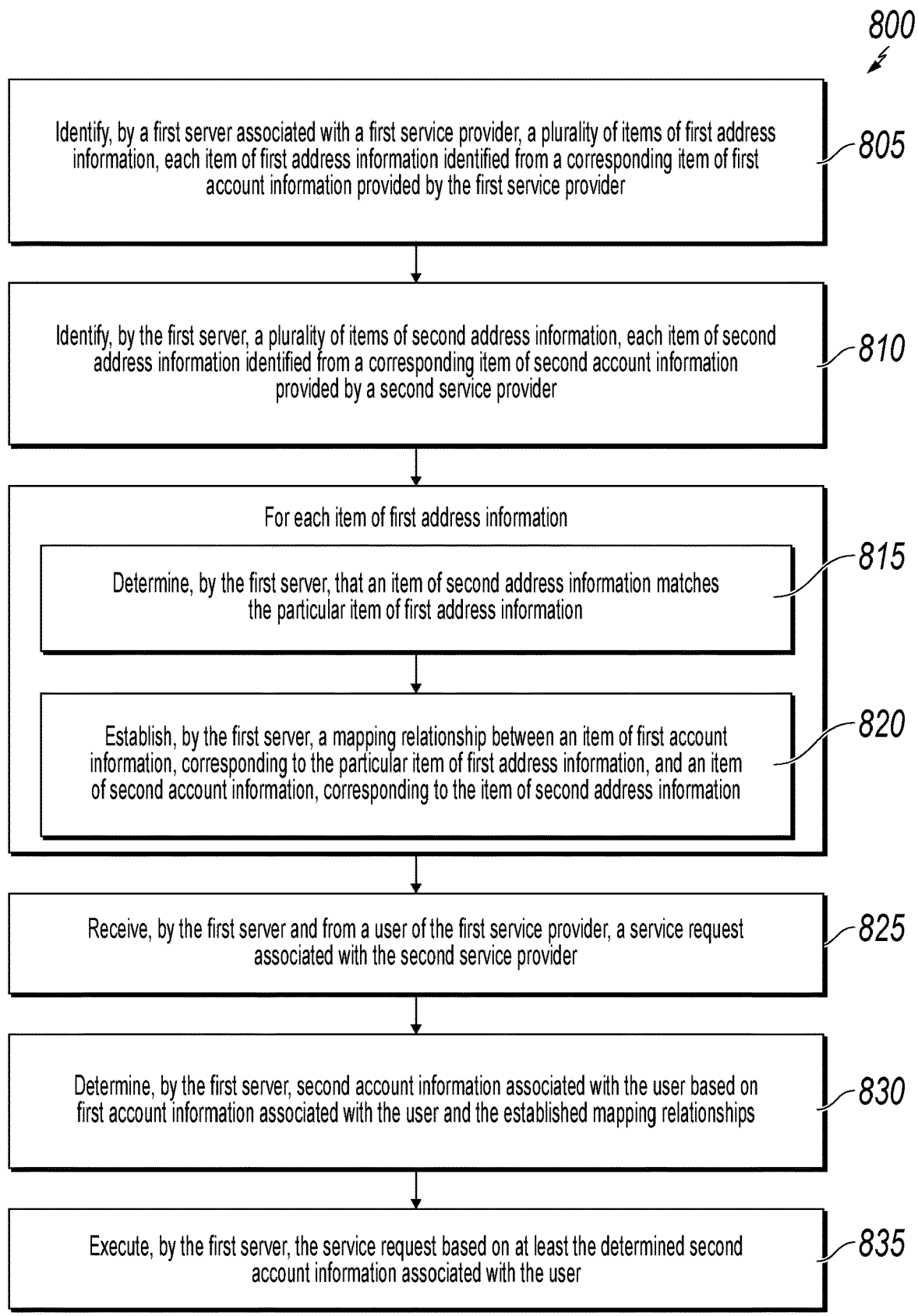
FIG. 8 is a flowchart illustrating an example method for address information-based account mapping according to the present disclosure.

FIG. 8 is a flowchart illustrating an example method 800 for address information-based account mapping according to the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order. In some implementations, the method 800 can include additional or different (or a combination of both) steps not shown in the flowchart. In some implementations, steps can also be omitted from the method 800.

At 805, multiple items of first address information are identified by a first server associated with a first service provider. Each item of first address information is identified from a corresponding item of first account information provided by the first service provider. For example, the first service provider can be a service provider that provides an application service to a user. The first account information of the user can include an account registered by the user at the first service provider, and first address information of the user, such as a delivery address. From 805, method 800 proceeds to 810.

At 810, multiple items of second address information are identified by the first server. Each item of second address information is identified from a corresponding item of second account information provided by a second service provider. The second service provider can be a service provider that provides, for example, a payment service to a user. In some implementations, the second service provider is different from the first service provider. The second account information of the user can include an account (for example, a payment account number) registered by the user at the second service provider, and second address information of the user, such as a home address. In some cases, the multiple items of second account information are transmitted by a second server associated with the second service provider to the first server. The second server can be different from the first server. In some implementations, the multiple items of second account information are transmitted by the second server periodically or in response to a request by the first server. The address feature information can be extracted from each item of first address information and each item of second address information to improve address information matching success rate. The address feature information can include at least one of latitude and longitude information, point of interest (POI) information, and numeric substring information. From 810, method 800 proceeds to 815.

For each item of first address information, the following operations (i.e., 815 and 820) are performed. At 815, a determination is made by the first server that an item of second address information matches the particular item of first address information. The item of second address information that matches the particular item of first address information is automatically determined from the identified multiple items of second address information. In some implementations, the item of second address information matching the particular item of first address information is determined using a k-d tree, such as a 2-dimensional k-d tree (that is, a 2-d tree).

In some implementations, for each item of first address information, a second address information candidate set is generated from the multiple items of second address information. For example, the second address information candidate set can be generated based on extracted address feature information from the particular item of first address information and extracted address feature information from each item of second address information. Each item of second address information in the second address information candidate set and the particular item of first address information satisfy a predetermined condition. The predetermined condition includes at least one of a distance between latitude and longitude of second address information and latitude and longitude of first address information being less than a predetermined distance threshold, POI information corresponding to second address information and POI information corresponding to first address information being the same, and a maximum quantity of same consecutive numeric substrings between second address information and first address information being greater than a predetermined quantity threshold. In some implementations, the item of second address information matching the particular item of first address information is determined from the generated second address information candidate set, instead of the whole set of the multiple items of second address information.

In some implementations, for each item of second address information in the generated second address information candidate set, $S=\beta_1 S_1+\beta_2 S_2$ is calculated. S is a matching value between the particular item of second address information and the particular item of first address information. $S_1$ and $\beta_1$ are a latitude and longitude matching value and a latitude and longitude matching significance between the particular item of second address information and the particular item of first address information, respectively. $S_2$ and $\beta_2$ are a numeric substring matching value and a numeric substring matching significance between the particular item of second address information and the particular item of first address information, respectively. In some implementations, $S_1=ke^{-d(c1,c2)}$, where $d(c1,c2)$ is a distance between latitude and longitude c1, corresponding to the particular item of second address information, and latitude and longitude c2, corresponding to the particular item of first address information, and k is a constant. In some implementations, $S_2=pN$, where N is a maximum quantity of same consecutive numeric substrings between the particular item of second address information and the particular item of first address information, and p is a constant. In some implementations, values of $\beta_1$ and $\beta_2$ can be determined based on experience. For example, $\beta_1$ can be set to 0.3, and $\beta_2$ can be set to 0.7. In some implementations, the item of second address information that matches the particular item of first address information is determined to be an item of second address information that has a highest matching value in the generated second address information candidate set. From 815, method 800 proceeds to 820.

At 820, a mapping relationship between an item of first account information, corresponding to the particular item of first address information, and an item of second account information, corresponding to the item of second address information, is established by the first server. For example, when the item of first account information includes the particular item of first address information and the item of second account information includes the item of second address information that matches the particular item of first address information, a mapping relationship is established between the item of first account information and the item of second account information. In some implementations, the first server considers that both the item of first account information and the item of second account information belong to the same user. From 820, method 800 proceeds to 825.

At 825, a service request associated with the second service provider is received by the first server and from a user of the first service provider. In some implementations, the service request can be a payment request by the user to make a payment to the second service provider. In some implementations, the service request does not include second account information associated with the user. From 825, method 800 proceeds to 830.

At 830, second account information associated with the user is determined, by the first server, based on first account information associated with the user and the established mapping relationships. For example, when the first server receives a payment request by a user to make a payment to the second service provider, the first server first determines the first account information (that is, the account information of the user at the first service provider). Then, the first server uses the established mapping relationships to determine second account information (that is, the account information of the user at the second service provider). In some implementations, the second account information of the user is automatically determined by the first server without the user providing the second account information to the first server. From 830, method 800 proceeds to 835.

At 835, the service request is executed, by the first server, based on at least the determined second account information associated with the user. For example, the first server can make a payment for the user to the second service provider using the determined second account information associated with the user. After 835, method 800 stops.

A user can use application software provided by an application service provider to, for example, make a payment to a payment service provider. Normally, the application service provider has its own account system that is separated from an account system of the payment service provider. As a result, the user needs to enter a payment account number associated with the payment service provider in order to make the payment through the application service provider. However, it is difficult for the user to memorize the payment account number associated with the payment service provider, hence results in poor user experience when using application software provided by the application service provider. The subject matter described in this specification can be used to establish association relationships between different account systems of different service providers. For example, by using address information included in account information, a mapping relationship can be established between account information in different account systems. Based on user account information registered at the application service provider, user account information registered at the payment service provider can be identified. As a result, a payment can be made through the application service provider without requiring the user to enter a payment account number associated with the payment service provider, and user experience can be improved when using application software provided by the application service provider.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   identifying, by a server associated with a first service provider, a plurality of items of first physical address information, wherein each item of first physical address information is identified from a corresponding item of first account information provided by the first service provider;
   identifying, by the server, a plurality of items of second physical address information, wherein each item of second physical address information is identified from a corresponding item of second account information provided by a second service provider to the first service provider; and
   for each item of first physical address information:
      determining, by the server, that an item of second physical address information matches a particular item of first physical address information; and
      in response to determining that the item of second physical address information matches the particular item of first physical address information, establishing, by the server, a mapping relationship between an item of first account information, corresponding to the particular item of first physical address information, and an item of second account information, corresponding to the item of second physical address information, wherein a first account with the first service provider is associated with the item of first account information, a second account with the second service provider is associated with the item of second account information, and the first account and the second account belong to a same user.

2. The computer-implemented method of claim 1, further comprising:
   receiving, by the server and from a user of the first service provider, a service request associated with the second service provider;
   determining, by the server, second account information associated with the user based on first account information associated with the user and the established mapping relationships; and
   executing, by the server, the service request based on at least the determined second account information associated with the user.

3. The computer-implemented method of claim 1, wherein a plurality of items of second account information are transmitted from the second service provider to the server.

4. The computer-implemented method of claim 1, further comprising:
   extracting address feature information from each item of first physical address information and each item of second physical address information; and
   for each item of first physical address information, generating a second address information candidate set from the plurality of items of second physical address information, wherein the second address information candidate set is generated based on extracted address feature information from the particular item of first physical address information and extracted address feature information from each item of second physical address information, wherein each item of second physical address information in the second address information candidate set and the particular item of first physical address information satisfy a predetermined condition, and wherein the item of second physical address information matching the particular item of first physical address information is determined from the generated second address information candidate set.

5. The computer-implemented method of claim 4, wherein the address feature information includes at least one of latitude and longitude information, point of interest (POI) information, and numeric substring information, and wherein the predetermined condition includes at least one of a distance between latitude and longitude of second physical address information and latitude and longitude of first physical address information being less than a predetermined distance threshold, POI information corresponding to second physical address information and POI information corresponding to first physical address information being the same, and a maximum quantity of same consecutive numeric substrings between second physical address information and first physical address information being greater than a predetermined quantity threshold.

6. The computer-implemented method of claim 5, wherein for each item of first physical address information determining that an item of second physical address information from the generated second address information candidate set matches the particular item of first physical address information includes:
  for each item of second physical address information in the generated second address information candidate set, calculating $S=\beta_1 S_1+\beta_2 S_2$, wherein S is a matching value between the particular item of second physical address information and the particular item of first physical address information, $S_1$ and $\beta_1$ are a latitude and longitude matching value and a latitude and longitude matching significance between the particular item of second physical address information and the particular item of first physical address information, respectively, and $S_2$ and $\beta_2$ are a numeric substring matching value and a numeric substring matching significance between the particular item of second physical address information and the particular item of first physical address information, respectively; and
  determining that an item of second physical address information from the generated second address information candidate set matches the particular item of first physical address information, wherein the item of second physical address information has a highest matching value in the generated second address information candidate set.

7. The computer-implemented method of claim 6, wherein $S_1=ke^{-d(c1,c2)}$, and wherein d(c1, c2) is a distance between latitude and longitude c1, corresponding to the particular item of second physical address information, and latitude and longitude c2, corresponding to the particular item of first physical address information, and k is a constant.

8. The computer-implemented method of claim 7, wherein $S_2=pN$, and wherein N is a maximum quantity of same consecutive numeric substrings between the particular item of second physical address information and the particular item of first physical address information, and p is a constant.

9. The computer-implemented method of claim 1, wherein the item of second physical address information matching the particular item of first physical address information is determined using a k-d tree.

10. A non-transitory, computer-readable medium storing one or more instructions executable by a computer system to perform operations comprising:
  identifying, by a server associated with a first service provider, a plurality of items of first physical address information, wherein each item of first physical address information is identified from a corresponding item of first account information provided by the first service provider;
  identifying, by the server, a plurality of items of second physical address information, wherein each item of second physical address information is identified from a corresponding item of second account information provided by a second service provider; and
  for each item of first address information:
    determining, by the server, that an item of second physical address information matches a particular item of first physical address information; and
    in response to determining that the item of second physical address information matches the particular item of first physical address information, establishing, by the server, a mapping relationship between an item of first account information, corresponding to the particular item of first physical address information, and an item of second account information, corresponding to the item of second physical address information, wherein a first account with the first service provider is associated with the item of first account information, a second account with the second service provider is associated with the item of second account information, and the first account and the second account belong to a same user.

11. The non-transitory, computer-readable medium of claim 10, the operations further comprising:
  receiving, by the server and from a user of the first service provider, a service request associated with the second service provider;
  determining, by the server, second account information associated with the user based on first account information associated with the user and the established mapping relationships; and
  executing, by the server, the service request based on at least the determined second account information associated with the user.

12. The non-transitory, computer-readable medium of claim 10, wherein a plurality of items of second account information are transmitted from the second service provider to the server.

13. The non-transitory, computer-readable medium of claim 10, the operations further comprising:
  extracting address feature information from each item of first physical address information and each item of second physical address information; and
  for each item of first physical address information, generating a second address information candidate set from the plurality of items of second physical address information, wherein the second address information candidate set is generated based on extracted address feature information from the particular item of first physical address information and extracted address feature information from each item of second physical address information, wherein each item of second physical address information in the second address information candidate set and the particular item of first physical address information satisfy a predetermined condition, and wherein the item of second physical address information matching the particular item of first physical address information is determined from the generated second address information candidate set.

14. The non-transitory, computer-readable medium of claim 13, wherein the address feature information includes at least one of latitude and longitude information, point of interest (POI) information, and numeric substring information, and wherein the predetermined condition includes at least one of a distance between latitude and longitude of second physical address information and latitude and longitude of first physical address information being less than a predetermined distance threshold, POI information corresponding to second physical address information and POI information corresponding to first physical address information being the same, and a maximum quantity of same consecutive numeric substrings between second physical address information and first physical address information being greater than a predetermined quantity threshold.

15. The non-transitory, computer-readable medium of claim 14, wherein for each item of first physical address information determining that an item of second physical address information from the generated second address information candidate set matches the particular item of first physical address information includes:
  for each item of second physical address information in the generated second address information candidate set, calculating $S=\beta_1 S_1+\beta_2 S_2$, wherein S is a matching value between the particular item of second physical address information and the particular item of first physical address information, $S_1$ and $\beta_1$ are a latitude and longitude matching value and a latitude and longitude matching significance between the particular item of second physical address information and the particular item of first physical address information, respectively, and $S_2$ and $\beta_2$ are a numeric substring matching value and a numeric substring matching significance between the particular item of second physical address information and the particular item of first physical address information, respectively; and determining that an item of second physical address information from the generated second address information candidate set matches the particular item of first physical address information, wherein the item of second physical address information has a highest matching value in the generated second address information candidate set.

16. The non-transitory, computer-readable medium of claim 15, wherein $S_1=ke^{-d(c1,c2)}$, and wherein d(c1, c2) is a distance between latitude and longitude c1, corresponding to the particular item of second physical address information, and latitude and longitude c2, corresponding to the particular item of first physical address information, and k is a constant.

17. The non-transitory, computer-readable medium of claim 16, wherein $S_2=pN$, and wherein N is a maximum quantity of same consecutive numeric substrings between the particular item of second physical address information and the particular item of first physical address information, and p is a constant.

18. The non-transitory, computer-readable medium of claim 10, wherein the item of second physical address information matching the particular item of first physical address information is determined using a k-d tree.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

identifying, by a server associated with a first service provider, a plurality of items of first address information, wherein each item of first physical address information is identified from a corresponding item of first account information provided by the first service provider;

identifying, by the server, a plurality of items of second physical address information, wherein each item of second physical address information is identified from a corresponding item of second account information provided by a second service provider to the first service provider; and for each item of first physical address information:
determining, by the server, that an item of second physical address information matches a particular item of first physical address information; and
in response to determining that the item of second physical address information matches the particular item of first physical address information, establishing, by the server, a mapping relationship between an item of first account information, corresponding to the particular item of first physical address information, and an item of second account information, corresponding to the item of second physical address information, wherein a first account with the first service provider is associated with the item of first account information, a second account with the second service provider is associated with the item of second account information, and the first account and the second account belong to a same user.

20. The computer-implemented system of claim 19, the operations further comprising:
receiving, by the server and from a user of the first service provider, a service request associated with the second service provider;
determining, by the server, second account information associated with the user based on first account information associated with the user and the established mapping relationships; and
executing, by the server, the service request based on at least the determined second account information associated with the user.

* * * * *

UNITED STATES PATENT AND TRADEMARK OFFICE
CERTIFICATE OF CORRECTION

PATENT NO. : 10,990,353 B2
APPLICATION NO. : 15/949981
DATED : April 27, 2021
INVENTOR(S) : Yang Zhou, Jun Xiong and Dijun He It is certified that error appears in the above-identified patent and that said Letters Patent is hereby corrected as shown below:

In the Claims

Column 23, Line 56, in Claim 10, delete "service provider;" and insert -- service provider to the first service provider; --, therefor.

Column 23, Line 57, in Claim 10, delete "first" and insert -- first physical --, therefor.

Column 26, Line 2, in Claim 19, delete "first" and insert -- first physical --, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*